Patented Sept. 29, 1942

2,297,424

UNITED STATES PATENT OFFICE 2,297,424

PROCESS FOR THE MANUFACTURE OF DI-OLEFINS FROM ALCOHOLS AND ALDE-HYDES

Alessandro Maximoff and Oberto Canonici, Milan, Italy; vested in the Alien Property Custodian No Drawing. Application January 26, 1940, Serial No. 315,860. In Italy February 15, 1939

6 Claims. (Cl. 260—681)

The object of the present invention is the manufacture of diolefins by reaction of an alcohol upon an aldehyde at high temperature in the presence of sulphates or of basic sulphates of aluminium.

While it was known since 1915 (Ostromisslenski Journal Russ. Phys. Chem. Soc. 47, 1472, 1509) that diolefins may be obtained by reacting alcohols upon aldehydes in the presence of aluminium oxide, it was not known heretofore that the aluminium sulphates are suitable for the manufacture of diolefins. The aluminium sulphates may be used directly or they may be deposited upon in active supports e. g. made of pumice stone, kieselguhr etc. In the latter case the manufacture of the catalyst is carried out by dissolving or suspending in water the aluminium sulphate, then soaking the support with the solution and thereafter drying the product obtained.

The aluminium sulphates used for the process in question do not require special methods for their manufacture and the usual salts of the commerce may also be used; the basic sulphates may be manufactured more cheaply by adding aluminium hydrate to a solution of aluminium sulphate or by adding to a solution of sodium aluminate the necessary quantity of aluminium sulphate or vice versa.

The alcohol and the aldehyde to be reacted together may be used both in the ratio of equimolecular weight or different from the equimolecular weight; they may be diluted with substances inert in respect of the reaction e. g. water or benzol. The reaction may be carried out both at atmospheric pressure or at a lower pressure. The temperature of reaction may range from 280° to 450° C.

The following examples are given by way of illustration:

Example I.—Upon a catalyst obtained from an aluminium salt of the composition

$Al_2O_3.2SO_3.12H_2O$ heated at 320°+360° C. are conveyed the vapours of a liquid having the following composition::

|  | Parts |
|---|---|
| Ethyl alcohol | 54 |
| Acetic aldehyde | 33.5 |
| Water | 12.5 |

The gases issuing from the apparatus of reaction are cooled and purified; among them 1.3 butadiene is present in the proportion of 15+24% by weight. From the condensed vapour ethyl alcohol and acetaldehyde are recovered. In this way, by taking into account the alcohol and the acetic aldehyde which may be recovered, the yield in ethyl alcohol and acetaldehyde consumed reaches the 33%.

Example II.—A salt of aluminium basic sulphate is obtained by reacting a solution of aluminium sulphate together with a solution of sodium aluminate. The resulting product is used for the manufacture of diolefins, e. g. the piperylene, by reacting upon it, heated at 340–380° C, a mixing consisting of 60 parts of isopropyl alcohol and 40 parts of acetic aldehyde.

Example III.—Granules of pumice-stone are soaked with a saturated solution of aluminium sulphate; thereafter they are thoroughly dried and are used as catalysts for the manufacture of butadiene from a mixing consisting of:

|  | Parts |
|---|---|
| Acetic aldehyde | 23 |
| Ethyl alcohol | 47 |
| Water | 30 |

The above examples are only by way of illustration of the invention and are not limitative thereof.

Aluminium sulphate manufactured in a manner different from those above disclosed may be used. Also other alcohols and other aldehydes may be used for the manufacture of other diolefins. The reaction may be carried out at temperature higher or lower than those mentioned in the examples.

What we claim is:

1. A method for manufacturing diolefin hydrocarbons comprising passing the vapors of a mixture of a monohydroxy alcohol and aldehydes over a catalyst selected from the group consisting of aluminum sulphates and basic aluminum sulphates at a temperature of 280–450° C., and separating the diolefin hydrocarbons formed from the reaction mixture.

2. A method for manufacturing diolefin hydrocarbons comprising passing the vapors of a mixture of a monohydroxy alcohol and aldehydes over a catalyst selected from the group consisting of aluminum sulphates and basic aluminum sulphates at a temperature of 280–450° C. at atmospheric pressure, and separating the diolefin hydrocarbons formed from the reaction mixture.

3. A method for manufacturing diolefin hydrocarbons comprising passing the vapors of a mixture of a monohydroxy alcohol and aldehydes over a catalyst selected from the group consisting of aluminum sulphates and basic aluminum sulphates at a temperature of 280–450° C. at a reduced pressure, and separating the diolefin hydrocarbons formed from the reaction mixture.

4. A method for manufacturing diolefin hydrocarbons comprising passing the vapors of a mixture of a monohydroxy alcohol and aldehydes over a catalyst formed of an inert porous material selected from the group consisting of pumice stone and kieselguhr on which is deposited a sulphate selected from the group consisting of aluminum sulphates and basic aluminum sulphates, at a temperature of 280–450° C. and separating the diolefin hydrocarbons formed from the reaction mixture.

5. A method of manufacturing 1,3 butadiene comprising passing the vapors of a mixture of ethyl alcohol and acetic aldehyde over a catalyst selected from the group consisting of aluminum sulphates and basic aluminum sulphates at a temperature between 280–450° C.

6. A method of manufacturing piperylene comprising passing the vapors of a mixture of isopropyl alcohol and acetic aldehyde over basic aluminum sulphates at a temperature of 280–450° C.

ALESSANDRO MAXIMOFF.
OBERTO CANONICI.